United States Patent
Bergqvist et al.

(10) Patent No.: US 8,423,018 B2
(45) Date of Patent: Apr. 16, 2013

(54) METHOD AND SYSTEM FOR MANAGING ROAMING OF A MOBILE EQUIPMENT

(75) Inventors: Per Bergqvist, Luxembourg (LU); Stefan Willehadson, Uppsala (SE); Sean Hinde, Dorset (GB)

(73) Assignee: Synapse International S.A., Mamer (LU)

( * ) Notice: Subject to any disclaimer, the term of this patent is extended or adjusted under 35 U.S.C. 154(b) by 129 days.

(21) Appl. No.: 13/123,226

(22) PCT Filed: Oct. 8, 2009

(86) PCT No.: PCT/SE2009/051125
§ 371 (c)(1),
(2), (4) Date: Apr. 7, 2011

(87) PCT Pub. No.: WO2010/042043
PCT Pub. Date: Apr. 15, 2010

(65) Prior Publication Data
US 2011/0195711 A1     Aug. 11, 2011

(30) Foreign Application Priority Data
Oct. 10, 2008  (SE) ...................................... 0802172

(51) Int. Cl.
*H04W 4/00*       (2009.01)
(52) U.S. Cl.
USPC ....................................... 455/432.1; 455/558
(58) Field of Classification Search .................. 455/433, 455/422.1, 558, 432.1, 404.1, 435.2, 412.1; 370/254, 335, 338
See application file for complete search history.

(56) References Cited

U.S. PATENT DOCUMENTS

| | | | |
|---|---|---|---|
| 6,996,398 B1 | 2/2006 | Powell | |
| 7,613,454 B2 * | 11/2009 | Zhang | 455/432.1 |
| 2006/0217153 A1 * | 9/2006 | Coles et al. | 455/558 |
| 2009/0247153 A1 * | 10/2009 | Haralson et al. | 455/432.1 |

FOREIGN PATENT DOCUMENTS

| | | |
|---|---|---|
| WO | WO 99/45723 | 9/1999 |
| WO | WO 01/54435 | 7/2001 |
| WO | WO 03/105512 | 12/2003 |
| WO | WO 2004/034623 | 4/2004 |
| WO | WO 2004/066663 | 8/2004 |
| WO | WO 2005/122601 | 12/2005 |

OTHER PUBLICATIONS

International Search Report for PCT/SE2009/051125, mailed Jan. 13, 2010.
International Preliminary Report on Patentability for PCT/SE2009/051125, mailed Oct. 7, 2010.

* cited by examiner

*Primary Examiner* — Kiet Doan
(74) *Attorney, Agent, or Firm* — Nixon & Vanderhye PC

(57) ABSTRACT

The present invention relates to a method for managing roaming of a mobile equipment of a subscriber, when the mobile equipment is roaming. The method comprises the steps: to store a first list customized for each subscriber, the first list comprises information regarding the visited countries, number of times a certain country have been visited, and for how long time the country have been visited; to store a second list customized for each subscriber, the second list comprises information about preferred operators for a part of the countries on the first list; to receive a roaming signal from the Home Location Register when the mobile equipment is roaming into another network or monitor a roaming signal intended for the Home Location Register; in response to the roaming signal, to update the first list; if the first list has changed above a predetermined threshold value, to update the second list; and to send the updated second list to the mobile equipment.

6 Claims, 4 Drawing Sheets

METHOD AND SYSTEM FOR MANAGING ROAMING OF A MOBILE EQUIPMENT

This application is the U.S. national phase of International Application No. PCT/SE2009/051125, filed 8 Oct. 2009, which designated the U.S. and claims priority to Swedish Application No. 0802172-7, filed 10 Oct. 2008, the entire contents of each of which are hereby incorporated by reference.

FIELD OF THE INVENTION

The present invention relates in a first aspect to a system operable to manage roaming of a mobile equipment of a subscriber.

According to a second aspect the present invention relates to a method for managing roaming of a mobile equipment of a subscriber.

According to a third aspect the present invention relates to at least one computer program product for managing roaming of a mobile equipment of a subscriber.

BACKGROUND OF THE INVENTION

When a mobile equipment is to be roamed into a foreign network, the equipment selects the network among a list of preferred networks that resides in the equipment. The list is updated by the operator that the subscription belongs to and it is contains other operators that the operator has roaming agreements with.

The list in the mobile equipment containing the allowed networks is possible to update over the air. This makes it possible for an operator to change the list when pricing models, agreements and operator constellations change. When a subscriber enters a roaming area the mobile equipment will select the preferred network from the list if it is present in the area.

The list is updated based on triggers in the system. When a subscriber enters a roaming area a new list will be sent to the mobile equipment of the subscriber from the network. The list contains the preferred operators to use.

The size of the list is limited meaning that it will never be possible to list all the preferred networks in it.

Solutions where a specie application resides on the SIM card also exists. This application communicates with a server in the network in order to keep the list updated.

The patent document U.S. Pat. No. 7,274,917 B2 relates to the management of roaming of mobile equipment between a home network and foreign network. The roaming behaviour is based on the contents of control files saved in the mobile equipment of the subscribers. A list of networks to be used in a priority order in a roaming situation is defined in the control files. The management application checks the current roaming setting for the mobile equipment and the desired roaming behaviour for the location that the mobile equipment roamed into. As a result of the comparison, the management application adjusts the roaming setting to be in accordance with the desired roaming behaviour.

A problem with one of the above described solutions is that when a subscriber travels to another country where he will roam into a network it is quite likely that one of the preferred networks is not defined in the list. This means that the subscriber will use an operator that is more expensive to use for the home operator. The list can be updated from the operator in this case but the update in itself has a cost and the equipment will not change to a preferred operator automatically. This also means that the actual usage of the equipment will be more expensive for the home operator as well. To conclude, this will affect the revenue stream for the is operator.

In cases were a custom application needs to reside on the SIM card, the current cards in use needs to be exchanged by the operator. This is in most cases a too expensive operation to perform for most operators.

One of the problems with the solution presented in U.S. Pat. No. 7,274,917 regarding how the method reacts on an incoming trigger is that a new list is sent immediately to the mobile equipment. Depending on the circumstances, this might be an improper way to handle the trigger. For example, a subscriber might be travelling close to a border of another country and the mobile equipment roams into an operators network in that country. The described method then acts upon this and sends out a new list to the mobile equipment immediately including a cost for the home operator. Furthermore, there is no personalisation of the lists, e.g. all subscribers use the same list depending on which country they are travelling to independent of the travelling pattern of the subscribers.

SUMMARY OF THE INVENTION

The above mentioned problems are solved by a system operable to manage roaming of a mobile equipment of a subscriber, when the mobile equipment is roaming between a home network and a foreign network according to Claim 1. The system comprises a Home Location Register connected to the home network. The system also comprises a first means for storing a first list customized for each subscriber. The first list comprises information regarding the countries visited by the mobile equipment, number of times a certain country have been visited by the mobile equipment, and for how long time the certain country have been visited by the mobile equipment. The system also comprises a second means for storing a second list customized for each subscriber. The second list comprises information about preferred operators for a part of the countries on the first list. The system also comprises a control means connected to the home network, the foreign network, the first means and the second means. The control means is operable to receive a roaming signal from the Home Location Register when the mobile equipment is roaming into another network or monitor a roaming signal intended for the Home Location Register when the mobile equipment is roaming into another network. The control means is also operable, in response to the roaming signal, to update the first list. The control means is also operable to periodically examine the first list, and if the first list has changed above a predetermined threshold value to update the second list, and thereafter to send the updated second list to the mobile equipment.

An advantage with the solution presented in Claim 1 is that it creates an optimal list containing only the preferred operators in the countries a certain subscriber has visited. Since it is likely that any given subscriber only visits a limited number of countries the actual sent updates of the second list in itself will be minimized. This means that the cost for sending updates of the second list will be minimized.

Another advantage is that the first means contains the number of times that each subscriber visits a certain country. This means that it might be a good foundation for the operator when selecting and negotiating roaming agreements with another operator.

A further advantage in this context is achieved if the control means is in the form of a roaming subscriber node.

According to another embodiment it is an advantage if the control means is in the form of a statistics node connected to the first means and the Home Location Register, and in the form of a roaming subscriber node connected to the second means and the statistics node.

Furthermore, it is an advantage in this context if the system also comprises a data node connected to the statistics node, and a third means for storing of Call Data Records, and connected to the data node, wherein the data node is operable to use the Call Data Records to create an initial second list as a default list for the second means.

A further advantage in this context is achieved if the second means also is operable to store several default lists, each matching a certain behaviour of the subscribers.

The above mentioned problems are also solved with a method for managing roaming of a mobile equipment of a subscriber with the aid of a system, when the mobile equipment is roaming between a home network and a foreign network according to Claim 6. The method comprises the steps: with the aid of a first means comprised in the system, to store a first list customized for each subscriber, the first list comprises information regarding the countries visited by the mobile equipment, number of times a certain country have been visited by the mobile equipment, and for how long time the certain country have been visited by the mobile equipment; with the aid of a second means comprised in the system, to store a second list customized for each subscriber, the second list comprises information about preferred operators for a part of the countries on the first list; with the aid of a control means comprised in the system, and connected to the home network, the foreign network, the first means, the second means, and a Home Location Register comprised in the system, to receive a roaming signal from the Home Location Register when the mobile equipment is roaming into another network or monitor a roaming signal intended for the Home Location Register when the mobile equipment is roaming into another network; with the aid of the control means, in response to the roaming signal, to update the first list and to periodically examine the first list; if the first list has changed above a predetermined threshold value, with the aid the control means, to update the second list; and to send the updated second list to the mobile equipment.

An advantage with the method according to the present invention is that it creates an optimal list containing only the preferred operators in the countries a certain subscriber has visited. Since it is likely that any given subscriber only visits a limited number of countries the actual sent updates of the second list in itself will be minimized. This means that the cost for sending updates of the second list will be minimized. The cost for roaming in itself will also be minimized since it is likely that a preferred operator will be part of the second list already when the subscriber visits the country.

A further advantage is that the first means contains the number of times that each subscriber visits a certain country. This means that it might be a good foundation for the operator when selecting and negotiating roaming agreements with another operator.

A further advantage in this context is achieved if the predetermined threshold value can be a certain number of times a mobile equipment have been in a certain country and/or a certain time period the mobile equipment have been in a certain country.

Furthermore, it is an advantage in this context if the system also comprises a data node, and a third means for storing of Call Data Records, and the method also comprises the step: with the aid of the data node, to use the Call Data Records to is create an initial second list as a default list for the second means.

A further advantage in this context is achieved if the method also comprises the step: with the aid of the second means, to store several default lists, each matching a certain behaviour of the subscribers.

The above mentioned problems are also solved with at least one computer 20 program product according to Claim 10.

It will be noted that the term "comprises/comprising" as used in this description is intended to denote the presence of a given characteristic, step or component, without excluding the presence of one or more other characteristic, features, integers, steps, components or groups thereof.

Embodiments of the invention will now be described with reference to the accompanying drawings, in which:

DETAILED DESCRIPTION OF THE PREFERRED EMBODIMENTS

Figure 1:
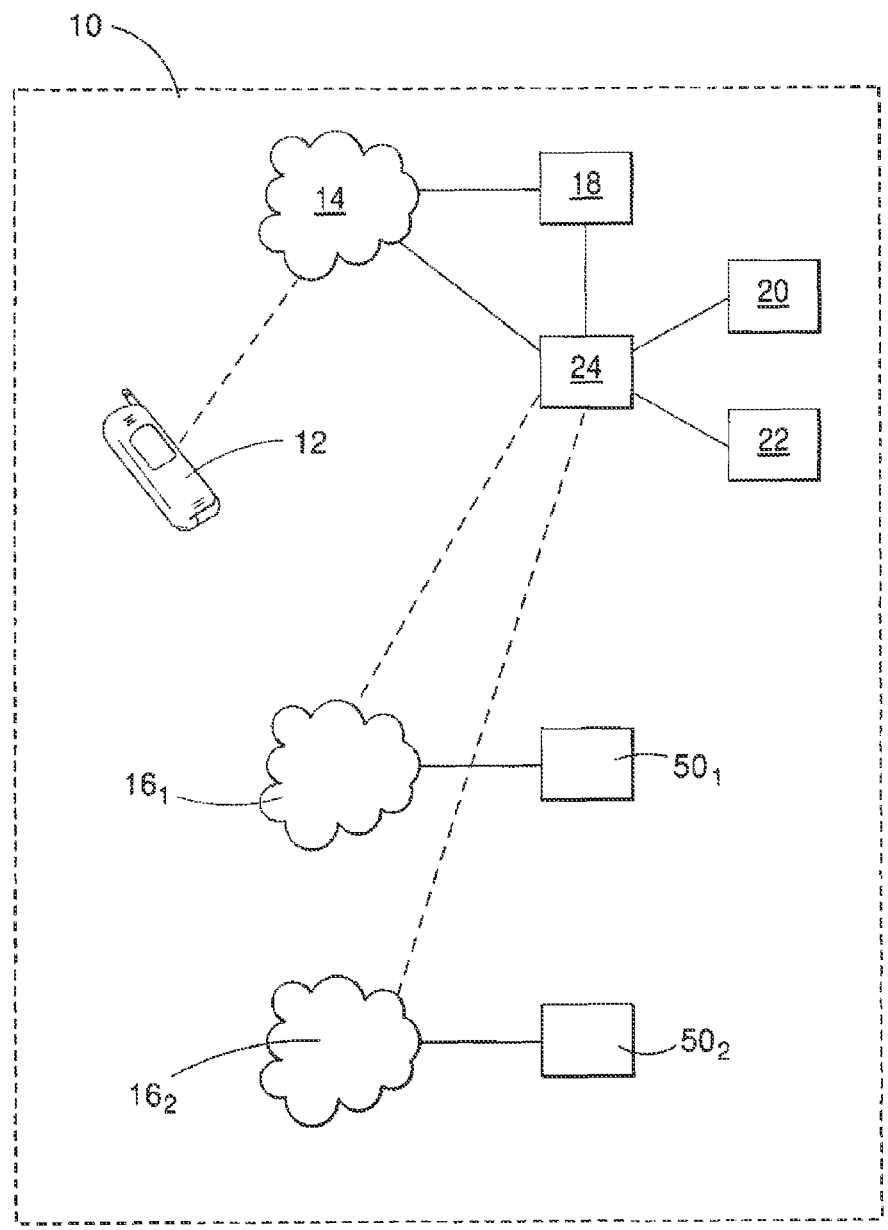
FIG. 1 is a block diagram of a first embodiment of a system operable to manage roaming of a mobile equipment according to the present invention.

In FIG. 1 there is disclosed a block diagram of a system 10 operable to manage roaming of a mobile equipment 12, when the mobile equipment is roaming between a home network 14 and a foreign network 16. In FIG. 1 there is disclosed two foreign networks 16$_1$ and 16$_2$. The system 10 comprises a Home Location Register 18 connected to the home network 14. As also is apparent in FIG. 1, the system 10 also comprises a first means 20 operable to store a first list customized for each subscriber. The first list comprises information regarding the countries visited by the mobile equipment 12, number of times a certain country have been visited by the mobile equipment 12 and for how long time the certain country have been visited by the mobile equipment 12. Furthermore, the system 10 also comprises a second means 22 operable to store a second list customized for each subscriber. The second list comprises information about preferred operators for a part of the countries on the first list. A control means 24 is connected to the home network 12, the foreign networks 16$_1$ and 16$_2$, the Home Location Register 18, the first means 20 and the second means 22. The control means 24 is operable to receive a roaming signal from the Home Location Register 18 when the mobile equipment 12 is roaming into another network or monitor a roaming signal intended for the Home Location Register 18 when the mobile equipment 12 is roaming into another network. In response to the roaming signal, the control means 24 is operable to update the first list. Furthermore, the control means 24 is also operable to periodically examine the first list, and if the first list has changed above a predetermined threshold value to update the second list. Thereafter, the control means 24 is operable to send the updated second list to the mobile equipment 12. Also disclosed in FIG. 1, are two Visit Location Registers 50$_1$ and 50$_2$.

In the embodiment disclosed in FIG. 1, the control means 24 is in the form of a roaming subscriber node 24.

Figure 2:
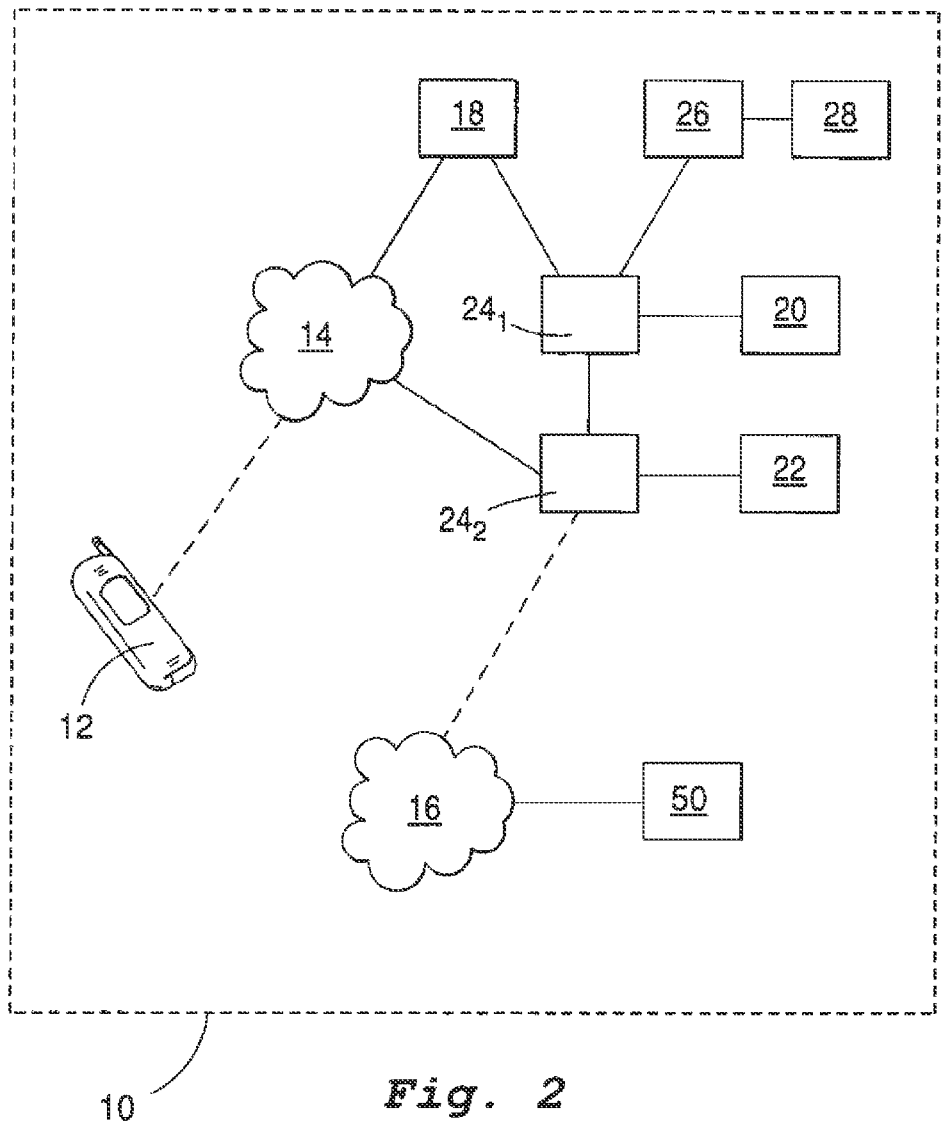
FIG. 2 is a block diagram of a second embodiment of a system operable to manage roaming of a mobile equipment according the present invention.

In FIG. 2 there is disclosed a second embodiment of a system 10 according to the present invention. Similar functional blocks in FIGS. 1 and 2 have been designated with similar reference signs and will not be described again. IN this embodiment, the control means 24 is divided into a statistics node 24₁ connected to the first means 20 and the Home Location Register 18, and a roaming subscriber node 24₂ connected to the second means 22 and the statistics node 24₁. Furthermore the system 10 also comprises a data node 26 connected to the statistics node 24₁, and a third means 28 operable to store Call Data Records. The third means 28 is connected to the data node 26. The data node 26 is operable to use the Call Data Records to create an initial second list as a default list for the second means 22.

Figure 3:
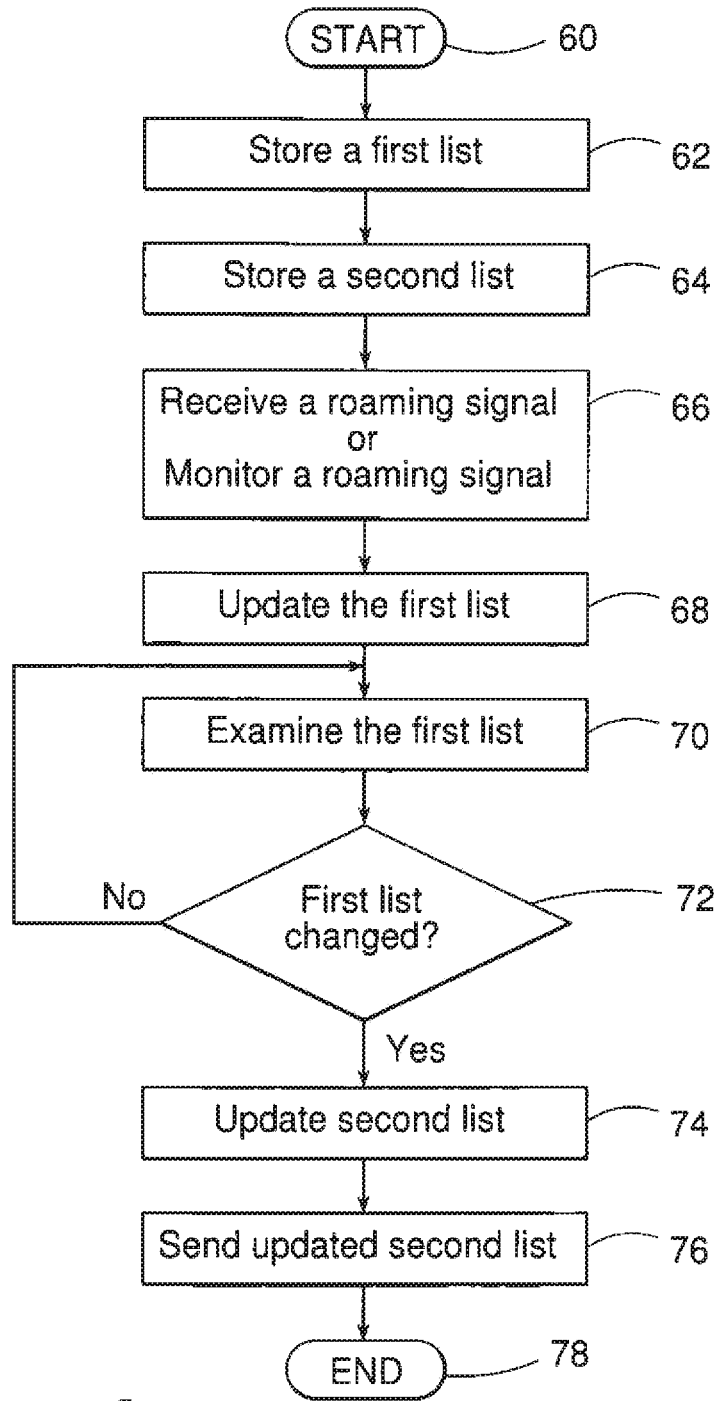
FIG. 3 is a flow chart of a method for managing roaming of a mobile equipment according the present invention.

In FIG. 3 there is disclosed a flow chart of a method for managing roaming to of a mobile equipment of a subscriber with the aid of a system 10. The method begins at block 60. The method continues, at block 62, with the step: with the aid of a first means 20 comprised in the system 10 (see FIGS. 1 and 2), to store a first list customized for each subscriber. The first list comprises information regarding the countries visited by the mobile equipment 12, number of times a certain country have been visited by the mobile equipment 12 and for how long time the certain country have been visited by the mobile equipment 12. Thereafter, the method continues, at block 64, with the step: with the aid of a second means 22 comprised in the system 10, to store a second list customized for each subscriber. The second list comprises information about preferred operators for a part of the countries on the first list. The method continues, at block 66, with the step: with the aid of a control means 24 comprised in the system 10, to receive a roaming signal from the Home Location Register 18 when the mobile equipment 12 is roaming into another network or to monitor a roaming signal intended for the Home Location Register 18 when the mobile equipment 12 is roaming into another network. Thereafter, the method continues, at block 68, with the step: in response to the roaming signal, with the aid of the control means 24, to update the first list, and in step 70, to periodically examine the first list. At block 72 the question is asked if the first list has changed above a predetermined threshold value? If the answer is negative, the step according to block 70 is performed again. If, on the other hand, the answer is affirmative, the method continues, at block 74, with the step: with the aid of the control means 24, to update the second list. Thereafter, the method continues, at block 76, with the step: to send the updated second list to the mobile equipment 12. The method is completed at block 78.

The network, contains a database that keeps track of the movement of any subscriber and populates the list with the preferred roaming operators according to the movement. This means that in time the list for any given subscriber will contain the preferred operators for the countries that the subscriber visits.

The database contains two lists for each subscriber:
1. Country list that contains often visited countries. This list is updated as soon as the subscriber is roamed into another network.
2. Roaming list that contains the preferred operators to use. This list is the one that is sent to the mobile device.

The country lists are updated using the following procedure:
1. The database receives a trigger informing about a roaming subscriber.
2. The country list is updated with information about the country in question, the time and which operator that the device roamed into. The number of times in conjunction with an approximative indication about how long a certain country has been visited is also a part of the list.

The roaming lists are updated using the following procedure:
1. The periodical timer has reached the time threshold thus starting this update job.
2. Examine the subscriber country list.
3. Populate the roaming list using information about which countries the subscriber has visited and use the preferred operator(s) for each country. Note that if the user hasn't been long enough or too few times in one country, the list will not be updated with preferred operators for this country. This can be seen as an hysteresis for the update.
4. if the list is changed then send the updated roaming list to the device.

Note that the initial roaming list for any given subscriber is a default list that is selected by the operator. The default list can be changed over time depending on changes in the roaming agreements or similar circumstances. It can also be changed depending on how subscribers roams into other networks. For example, if many subscribers often visits a certain country the default list should be updated to contain the preferred operator for that country. This update procedure can be a part of the standard periodical update where the default list is changed over time. The invention can also handle a situation where there exists several default lists, each matching a certain known behaviour of the subscribers. This behaviour can be monitored using the method described above, e.g. by collecting data of the subscribers and then use this data for creating the default lists. Default lists can also be created manually by the operator that matches known behaviours of the subscribers. The different default lists are then used initially for each subscriber by either pre-selecting a certain list due to knowledge about how the subscriber will use is his device. for example travels frequently to a certain country or has a subscription with a low cost for calling a specific country or set of countries. A certain default list can also be automatically assigned for a subscriber by monitoring his behaviour for a specific time period and then automatically assign a default list to him that matches his behaviour. For example, if a subscriber calls a certain country a lot, it is likely that he in time will travel to that country and therefore a default list containing a preferred operator for that country is assigned to the subscriber. Note that the assignment of good default lists is important since it will decrease the cost for the operator due to that any subscriber will use a preferred roaming operator initially. Furthermore, it isn't necessary for the home operator to send an updated list to a subscriber when he visits that country since a preferred operator already is a part of the list. Thus is the cost for performing the actual update of the list also minimised.

Note that the need to have different default lists that are used initially is preferred since there is a limited size of the number of entries in the lists and that it is impossible to have all preferred operators in the list.

Figure 4:
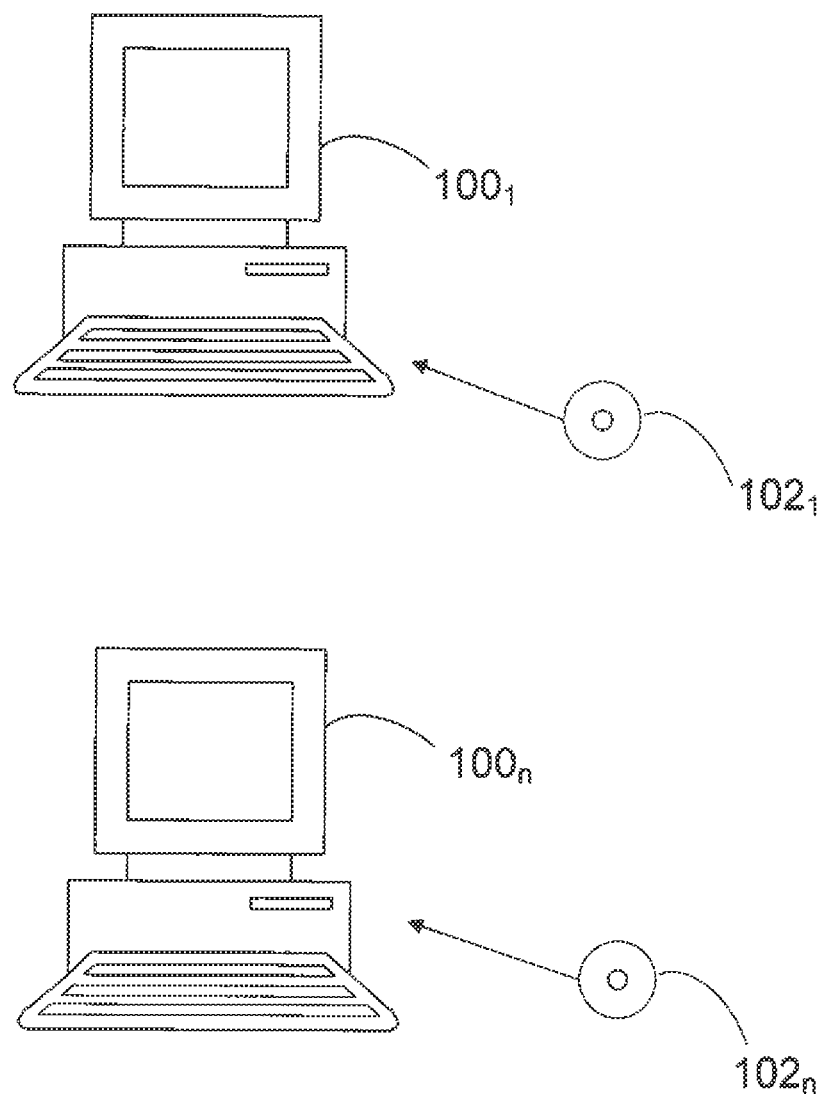
FIG. 4 schematically shows a number of computer program products according to the present invention.

In FIG. 4 there is schematically disclosed some computer program products $102_1, \ldots, 102n$ according to the present invention. In FIG. 4, n different digital computers $100_1, \ldots, 100n$ are shown, wherein n is an integer. In FIG. 4, n different computer program products 1021, 102n are shown, here shown in the form of CD discs. The different computer program products $102_1, \ldots, 102_n$ are directly loadable into the internal memory of the n different computers $100_1, \ldots, 100$. Each computer program product $102_1, \ldots, 102$, comprises software code portions for executing all the steps according to FIG. 3, when the product/products is/are run on the computers $100_1, \ldots, 100$. The computer program products $102_1, \ldots, 102$,—, may, for instance, be in the form of diskettes, RAM discs, magnetic tapes, magneto-optical discs or some other suitable products.

The invention is not limited to the described embodiments. It will be evident for those skilled in the art that many different modifications are feasible within the scope of the following Claims.

The invention claimed is:

1. A system operable to manage roaming of a mobile equipment of a subscriber, when said mobile equipment is roaming between a home 5 network and a foreign network (16), said system comprising a Home Location Register connected to said home network, characterized in that said system also comprises a first means for storing a first list customized for each subscriber, said first list comprises information regarding the countries visited by said mobile equipment, number of times a certain country have been visited by said mobile equipment, and for how long time said certain country have been visited by said mobile equipment, a second means for storing a second list customized for each subscriber, said second list comprises information about preferred operators for a part of said countries on said first list, and a control means connected to said home network, said foreign network said Home Location Register, said first means, and said second means, and operable to receive a roaming signal from said Home Location Register when said mobile equipment is roaming into another network or monitor a roaming signal intended for said Home Location Register, and in said roaming signal to update said first list, wherein said control means also is operable to periodically examine said first list, and if said first list has changed above a predetermined threshold value to update said second list, and thereafter to send said updated second list to said mobile equipment, wherein said control means is in the form of a statistics node connected to said first means and said Home Location Register, and in the form of a roaming subscriber node connected to said second means and said statistics node, wherein said system also comprises a data node connected to said statistics node and a third means for storing of Call Data Records, and connected to said data node, wherein said data node is operable to use said Call Data Records to create an initial second list as a default list for said second means.

2. A system operable to manage roaming of a mobile equipment of a subscriber according to claim 1, characterized in that said second means also is operable to store several default lists, each matching a certain behavior of said subscribers.

3. A method for managing roaming of a mobile equipment of a subscriber with the aid of a system, when said mobile equipment is roaming between a home network and a foreign network, said method comprises the steps of with the aid of a first means comprised in said system, to store a first list customized far each subscriber, said first list comprises information regarding the countries visited by said mobile equipment, number lo of times a certain country have been visited by said mobile equipment, and for how long time said certain country have been visited by said mobile equipment; with the aid of a second means comprised in said system, to store a second list customized for each subscriber, said second list comprises information about preferred operators for a part of said countries on said first list; with the aid of a control means comprised in said system, and connected to said home network, said foreign network, said first means, said second means, and a Home Location Register comprised in said system, to receive a roaming signal from said Home Location Register when said mobile equipment is roaming into another network or monitor a roaming signal intended for said Home Location Register; with the aid of said control means, in response to said roaming signal, to update said first list and to periodically examine said first list; if said first list has changed above a predetermined threshold value, with the aid of said control means, to update said second list; and to send said updated second list to said mobile equipment, wherein said system also comprises a data node, and a third means for storing of Call Data Records, said method also comprises the step: with the aid of said data node, to use said Call Data Records to create an initial second list as a default list for said second means.

4. A method for managing roaming of a mobile equipment of a subscriber according to claim 3, characterized in that said predetermined threshold value can be a certain number of times a mobile equipment have been in a certain country and/or a certain time period said mobile equipment have been in a certain county.

5. A method far managing roaming of a mobile equipment of a subscriber according to claim 4, characterized in that said method also comprises the step: with the aid of said second means, to store several s default Lists, each matching a certain behavior of said subscribers.

6. At least one computer program product ($102_1, \ldots, 102_n$) directly loadable into the internal memory of at least one digital computer ($100_1, \ldots 100_n$), comprising software code portions for performing the steps of claim 3 when said at least one product ($102_1, \ldots, 102_n$) islare run on said at least one computer ($100_1, \ldots 100_n$).

* * * * *